Patented Dec. 30, 1952

2,623,899

UNITED STATES PATENT OFFICE 2,623,899

DIAZABUTADIENE SULFONIC ACIDS

Eric Hoggarth, Blackley, Manchester, England, assignor to Imperial Chemical Industries Limited, a corporation of Great Britain No Drawing. Application July 31, 1950, Serial No. 176,909. In Great Britain August 10, 1949

3 Claims. (Cl. 260—506)

This invention relates to new diazabutadiene sulphonic acids which possess chemotherapeutic activity against experimental tubercular infections of small animals.

The said new diazabutadiene sulphonic acids of chemotherapeutic activity which, according to this invention, we provide, are compounds of the formula $$RCH=N.N=C-NH_2$$
$$\quad\quad\quad\quad\quad |$$
$$\quad\quad\quad\quad SO_3H$$

wherein R stands for a phenyl radical which may optionally bear as a para substituent, a chlorine atom, the group —$SO_2C_2H_5$ or the group

—$NHCOCH_3$

The new diazabutadiene sulphonic acids may be manufactured, and it is a further feature of the invention so to manufacture them, by a process which comprises oxidising araldehyde thiosemicarbazones of the formula $$RCH=N.NH.CS.NH_2$$

where R has the significance stated above, by means of per-compounds, for example peroxides and per-acids, especially hydrogen peroxide.

The said oxidation is preferably carried out in glacial acetic acid solution the reaction temperature being maintained below 10° C.

The starting materials, the araldehyde thiosemicarbazones, are a known class of compounds and are known to show antitubercular activity in vitro and against experimental tubercular infections of small animals (Domagk, Zentr. f Gynäk., 1947, 69, 833). The new compounds of the present invention show a greater antitubercular activity under the same conditions and possess moreover greater ease of administration by reason of their capacity to form soluble salts.

The invention is illustrated but not limited by the following examples in which the parts are by weight.

Example 1

A mixture of 400 parts of glacial acetic acid and 100 parts of hydrogen peroxide (100 volume) is stirred and kept at 0° C. and 30.0 parts of benzaldehyde thiosemicarbazone are added to it slowly during one hour. Stirring is then continued during a further 18 hours the temperature being allowed to rise slowly to 22° C. 2000 parts of a mixture of water and ice are then added and the mixture is filtered and the residual solid is washed with water. The solid is then stirred with 600 parts of water, 100 parts of a 20% aqueous solution of potassium bicarbonate are added, the solution is filtered and the filtrate acidified to Congo red by addition of aqueous hydrochloric acid. It is then again filtered and the residual solid recrystallised from alcohol. It consists of 1-amino-4-phenyl-2 : 3-diazabuta-1 : 3-diene-1-sulphonic acid, M. P. 254–256° C.

Example 2

The process of Example 1 is repeated, using, in place of 30.0 parts of benzaldehyde thiosemicarbazone, 44 parts of p-ethylsulphonylbenzaldehydethiosemicarbazone. There is obtained 1-amino-4-p-ethylsulphonylphenyl-2:3-diazabuta-1:3-diene-1-sulphonic acid which, recrystallised from β-ethoxyethanol, has M. P. 242–243° C.

Example 3

The process of Example 1 is repeated, using in place of the 30.0 parts of benzaldehyde thiosemicarbazone, 40.0 parts of p-acetylaminobenzaldehyde thiosemicarbazone. There is obtained 1-amino-4-p-acetylaminophenyl-2 : 3-diazabuta-1:3-diene-1-sulphonic acid which has M. P. 198°–200° C. (decomp.).

Example 4

The process of Example 1 is repeated using in place of the 30.0 parts of benzaldehyde thiosemicarbazone, 35.0 parts of p-chlorobenzaldehyde thiosemicarbazone. There is obtained 1-amino-4-p-chlorophenyl-2 : 3-diazabuta-1 : 3-diene-1-sulphonic acid which has M. P. 151° C. (decomp.).

What I claim is:
1. New diazabutadiene sulfonic acids of the formula

$$X-\langle\bigcirc\rangle-CH=N.N=C-NH_2$$
$$\quad\quad\quad\quad\quad\quad\quad\quad\quad |$$
$$\quad\quad\quad\quad\quad\quad\quad\quad SO_3H$$

wherein X represents a radical selected from the group consisting of hydrogen, chlorine,

—$SO_2C_2H_5$ and —$NHCOCH_3$.

2. Process for the manufacture of the new diazabutadiene sulfonic acids of claim 1, which comprises oxidizing araldehyde thiosemicarbazones of the formula $$X-\langle\bigcirc\rangle-CH=N.NH.CS.NH_2$$

wherein X has the meaning stated in claim 1, by reaction with hydrogen peroxide in organic acid solution.

3. Process for the manufacture of the new diazabutadiene sulfonic acids of claim 1, which comprises oxidizing araldehyde thiosemicarbazones of the formula

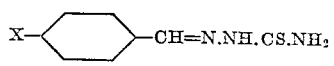

wherein X has the meaning stated in claim 1, by reaction with hydrogen peroxide in glacial acetic acid solution and at a temperature of below 10° C.

ERIC HOGGARTH.

REFERENCES CITED

The following references are of record in the file of this patent:

Chemical Abstracts, 32, 3342 (1938), "Reaction between organic sulfur compounds and hydrogen peroxide." V. Thiosemicarbozide and Thiosemicarbazone.